United States Patent [19]
Katiyar

[11] Patent Number: 5,818,448
[45] Date of Patent: Oct. 6, 1998

[54] APPARATUS AND METHOD FOR IDENTIFYING SERVER COMPUTER AGGREGATION TOPOLOGIES

[75] Inventor: Dinesh Katiyar, Mountain View, Calif.

[73] Assignee: Sun Microsystems, Inc., Mountain View, Calif.

[21] Appl. No.: 678,408

[22] Filed: Jul. 2, 1996

[51] Int. Cl.⁶ .............................. G06F 3/00; H04L 12/00
[52] U.S. Cl. ...................... 345/335; 395/200.49
[58] Field of Search ............. 395/200.3, 200.31, 395/200.33, 200.49, 680, 683, 684, 200.47, 200.48; 345/335

[56] References Cited

U.S. PATENT DOCUMENTS

| | | | |
|---|---|---|---|
| 5,475,819 | 12/1995 | Miller et al. | 395/200.33 |
| 5,483,652 | 1/1996 | Sudama et al. | 707/10 |
| 5,515,510 | 5/1996 | Kikinis | 395/200.33 |
| 5,692,180 | 11/1997 | Lee | 1/1 |
| 5,748,897 | 5/1998 | Katiyar | 395/200.49 |

OTHER PUBLICATIONS

"Open Environment's Olenterprise Delivers Networked OLE," PR Newswire (11 Mar. 1996) p. 311.

Primary Examiner—A. Katbab
Attorney, Agent, or Firm—Flehr Hohbach Test Albritton & Herbert LLP; William S. Galliani

[57] ABSTRACT

A method of processing a remote procedure call from a client computer to an object stored on an aggregation of server computers includes the step of checking a server aggregation location data field and a server aggregation contact strategy data field of the remote procedure call. The aggregation of server computers is designated as replicating server computers, migrating server computers, or federated server computers based upon the checking operation. Once a server computer aggregation topology is identified, parameters associated with the remote procedure call may be modified to alter the interaction with the server computer aggregation.

24 Claims, 7 Drawing Sheets

APPARATUS AND METHOD FOR IDENTIFYING SERVER COMPUTER AGGREGATION TOPOLOGIES

BRIEF DESCRIPTION OF THE INVENTION

This invention relates generally to aggregations of server computers that collaborate to provide a service in distributed client-server computer systems. More particularly, this invention relates to a technique of interacting with an aggregation of server computers based upon a derived characterization of the server computer aggregation.

BACKGROUND OF THE INVENTION

In a client/server computer network, the user of a client computer requests the execution of an object. In particular, the user requests the execution of a method associated with the object. Frequently, the object is not stored locally on the client computer. Thus, a remote procedure call (RPC) must be made to a server computer on which the object resides. In most cases, the server computer executes the requested method to generate a result. The result is then passed to the client computer.

It is common to provide an aggregation of server computers that collaborate to supply a service to client computers. This collaboration of server computers may be referred to as server aggregation. Reasons to use server aggregation include: robustness and fault-tolerance, load-balancing, data partitioning, allowing for system evolution (upgrades, etc.), priority and secure servicing, etc. The development of almost any mission-critical application makes use of some form of aggregation, and thus it is important that any distributed application develop a framework that provides support for it.

FIG. 1 illustrates a client/server computer apparatus 20 in accordance with the prior art. The apparatus 20 includes a set of client computers 22A–22N, which are each linked to a transmission channel 23. The transmission channel 23 generically refers to any wire or wireless link between computers. The client computers 22A–22N use the transmission channel 23 to communicate with a set of server computers 24A–24N, forming a server aggregation 25.

Each client computer 22 has a standard computer configuration including a central processing unit (CPU) 30, connected to a memory 32, which stores a set of executable programs. The executable programs in this exemplary system include at least one client application program 34, client stubs 38, client subcontracts 40, and an operating system 42.

The client application program 34 is any application-level program, such as an application program that the user of a client computer 22 interacts with. The client stubs 38 receive procedure calls by the application program 34 requesting the execution of specified methods of specified objects. The purpose of the client stubs 38 is to access objects that are implemented in other address spaces, such as at the server computers 24A–24N.

The client subcontract programs 40 and server subcontract programs 58 control the basic mechanisms of object invocation and argument passing. They control how object invocation is implemented, how object references are transmitted between address spaces, how object references are released, and similar object runtime operations. For example, when a client invokes an object of a given subcontract, the subcontract implements the object invocation by transmitting the request to the address space where the associated object is located, commonly a server computer 24 of the server aggregation 25.

The client subcontract programs 40 perform a marshal operation to transmit an object invocation (i.e., a remote procedure call) to another address space. A corresponding un-marshalling operation is performed by a server subcontract 58 on a server computer 24. The client subcontract programs 40 also perform unmarshal operations when receiving a reply (such as the results generated from a method call) from another computer, say the server computer 24. An operating system 42 underlies the operations of the client application programs 34, the client stubs 38, and the client subcontracts 40.

Each server computer 24 has a configuration analogous to that of each client computer 22. Each server 24 includes a CPU 50 and an associated memory 52. The memory 52 stores server application programs 54, server stubs 56, server subcontract programs 58, and an operating system 60. As indicated above, the server stubs 56 handle incoming method invocations on an object and call the specified method to perform the operation. As also indicated above, the server subcontracts 58 perform data marshalling and other operations to support the transport of method invocations and the resulting return messages between the server 24 and the client computers 22.

The operations of the apparatus of FIG. 1 are more fully appreciated with reference to FIG. 2. FIG. 2 illustrates the client computer 22A, the transmission channel 23, and the server computer 24A.

As indicated above, a client application 34 invokes a specified method of an object in a different address space using a remote procedure call. The remote procedure call is passed by the client stubs 38 to the client subcontract 40, which packages the remote procedure call for transport on the transmission channel 23. The server subcontract 58 of the server 24A receives the information and un-packages it. The server subcontract 58 then passes the information to the server stubs 56. The server stubs 56 access the server application programs 54, which are the previously described object methods. More specifically, a specified server stub 56 makes a procedure call to execute a specified method of the invoked object. The execution of the method produces a set of results, herein called a reply, which is then passed back to the server subcontract 58 and the communication path is reversed, as indicated by the arrows of FIG. 2.

Block 70 of FIG. 2 illustrates the components associated with an Object Request Broker (ORB). An ORB is a distributed mechanism for handling remote procedure calls. The mechanism is distributed in the sense that the software associated with an ORB is on both the client computer 22 and the server computer 24.

The present invention is directed toward a distributed object client/server computer system of the type described in relation to FIGS. 1 and 2. More particularly, the invention is directed toward the operation of a server computer aggregation 25 in a distributed object client/server computer system. Existing server computer aggregations lack a common architectural basis that can be used to provide clean and elegant implementations of server aggregation features. The absence of a common architectural basis for server aggregation features prevents a reasonably uniform view for both system users and administrators. Thus, it would be highly desirable to provide a clean and elegant implementation of server aggregation features. Such an implementation would provide a reasonably uniform systematic approach for both system users and administrators.

SUMMARY OF THE INVENTION

An embodiment of the invention includes a method of processing a remote procedure call from a client computer to an object stored on an aggregation of server computers. A server aggregation location data field and a server aggregation contact strategy data field of the remote procedure call are checked. The aggregation of server computers is designated as replicating server computers, migrating server computers, or federated server computers based upon the checking operation. Once a server computer aggregation topology is identified, parameters associated with the remote procedure call may be modified to alter the interaction with the server computer aggregation.

The invention's identification and use of server aggregation topology information provides a clean and elegant implementation for server aggregation features. In addition, the server aggregation topology information provides a reasonably uniform and systematic approach for both system users and administrators.

BRIEF DESCRIPTION OF THE DRAWINGS

For a better understanding of the nature and objects of the invention, reference should be made to the following detailed description taken in conjunction with the accompanying drawings, in which.

Figure 1:
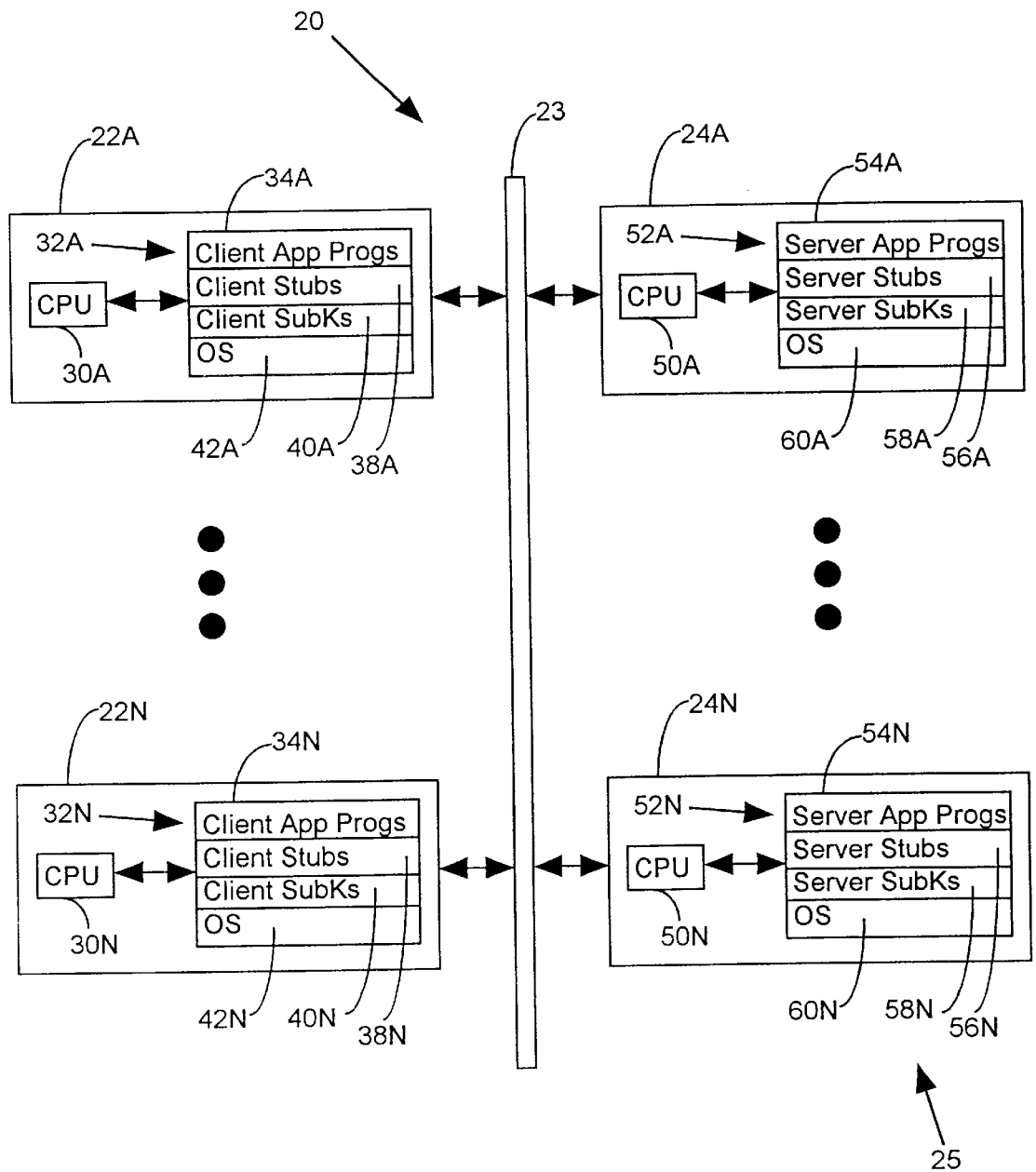
FIG. 1 illustrates a prior art client/server computer system with a server computer aggregation.
Figure 2:
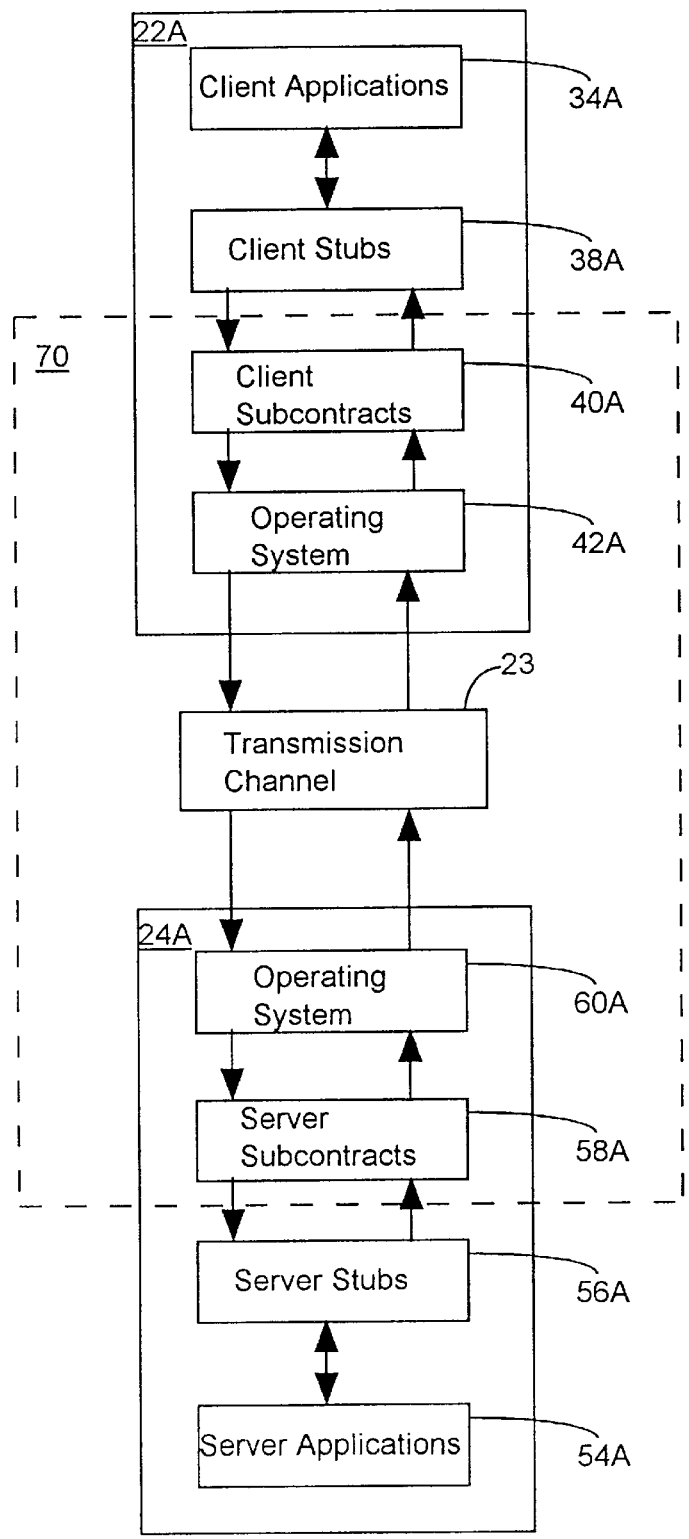
FIG. 2 illustrates the handling of remote procedure calls in the system of FIG. 1.

Like reference numerals refer to corresponding parts throughout the several views of the drawings. DETAILED DESCRIPTION OF THE INVENTION In the system of FIG. 1, a client computer, say client computer 22A, contacts the aggregation of server computers 25 by initially contacting a primary server, say server computer 24A. More particularly, a client computer, say client computer 22A, generates a remote procedure call to an object stored on a primary server, say server computer 24A. (In the following discussion it is understood that a reference to a client computer 22 contacting a server computer 24 contemplates a remote procedure call from the client computer 22 to the server computer 24.) After the client computer accesses the primary server, other server computers, say server computers 24B and 24C, in the aggregation 25 are then contacted by the client computer 22A.

The present invention departs from the approach described in reference to FIG. 1. In particular, the invention utilizes a dual-role smart proxy server computer as a gateway to an aggregation of server computers. This operation can be appreciated with reference to FIG. 3.

Figure 3:
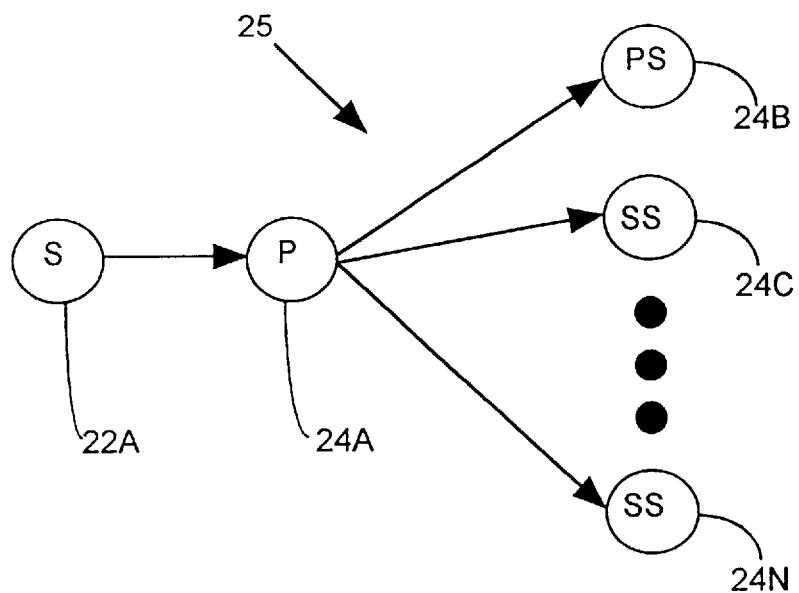
FIG. 3 illustrates processing operations associated with a client computer accessing a server computer aggregation with a dual-role proxy, in accordance with an embodiment of the invention.

FIG. 3 illustrates a client computer 22A and a server computer aggregation 25 including server computers 24A–24N. In accordance with the invention, the server computer aggregation 25 includes three types of server computers: a dual-role proxy server computer 24A, a primary server computer 24B, and a set of secondary server computers 24C–24N.

The client computer 22A initially contacts the dual-role proxy server computer 24A. Thereafter, the dual-role proxy server computer 24A contacts the remaining server computers 24B–24N of the aggregation 25. Thus, in this embodiment of the invention, the dual-role proxy server computer 24A operates as a front-end server computer for the server aggregation 25.

The dual-role proxy server computer 24A performs this operation for client computers that are not clients of the aggregation 25. In other words, a client computer is involved, but the client computer is a non-client of the server aggregation 25, meaning it has substantially limited knowledge and access to the server aggregation 25.

Figure 4:
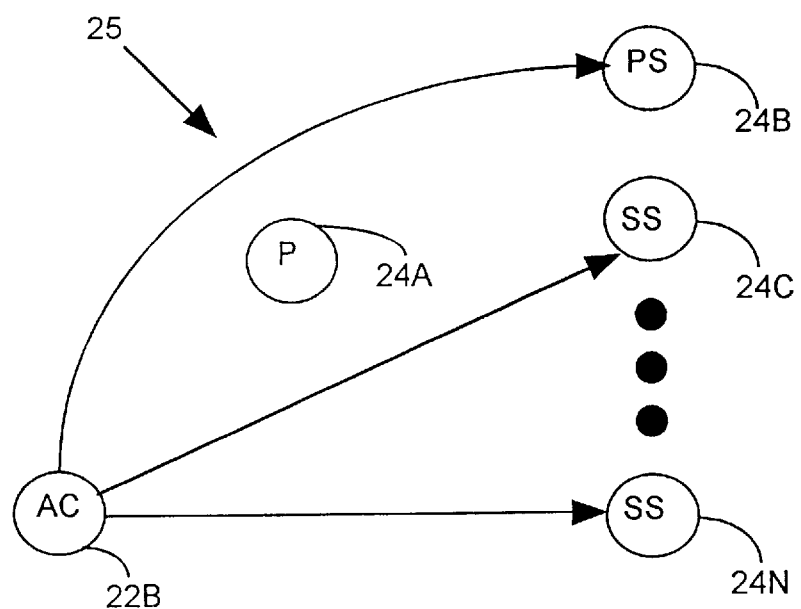
FIG. 4 illustrates processing operations associated with a client computer accessing a server computer aggregation with a dual-role proxy, in accordance with an embodiment of the invention.

FIG. 4 illustrates a server aggregation 25 being accessed by an aggregation client server computer 22B. The aggregation client server computer 22B has substantial knowledge and access to the server aggregation. As a result, it can bypass the dual-role proxy server computer 24A and directly contact the primary server 24B and secondary servers 24C–24N. This approach is feasible when server aggregation information can be statically determined and embedded in an object reference.

Server aggregation information is not always static. Frequently, the location of servers is dynamically configurable and updated. In this case, it is necessary for a client computer to obtain this dynamic information.

Figure 5:
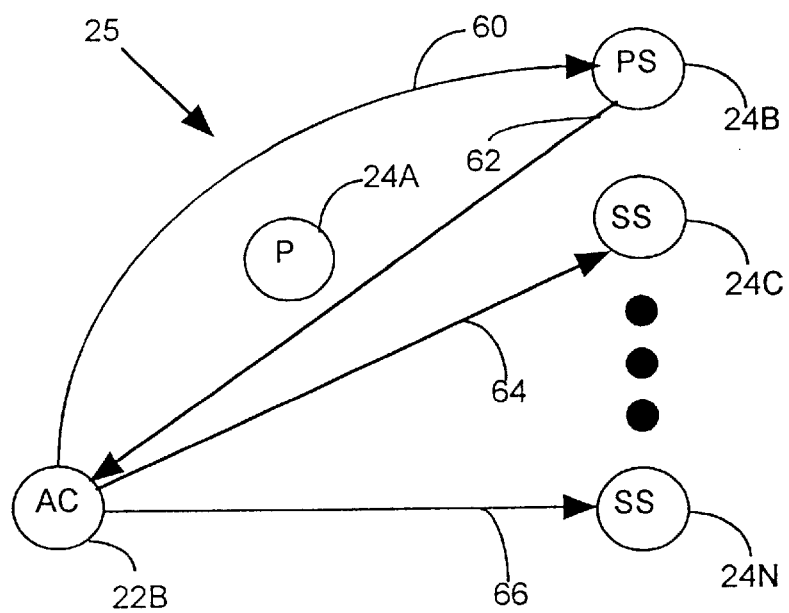
FIG. 5 illustrates processing operations associated with a client computer accessing a server computer aggregation with a dual-role proxy, in accordance with an embodiment of the invention.

FIG. 5 illustrates a processing sequence that can accomplish the required update of dynamic information for a client computer. FIG. 5 illustrates a client computer 22B directly accessing a primary server 24B, as shown with arrow 60. The primary server 24B then passes dynamic information back to the aggregation client computer 22B, as shown with arrow 62. With the updated dynamic information, the aggregation client computer 22B may then directly access the secondary servers 24C–24N, as shown with arrows 64 and 66. Note once again that the dual-role proxy computer 24A is bypassed.

Fault-tolerant behavior in a server aggregation 25 requires the aggregation client computer 22B to be able to communicate with the servers in the aggregation even if the primary server 24B is unavailable. In this case, the dual-role proxy server 24A may be exploited.

Figure 6:
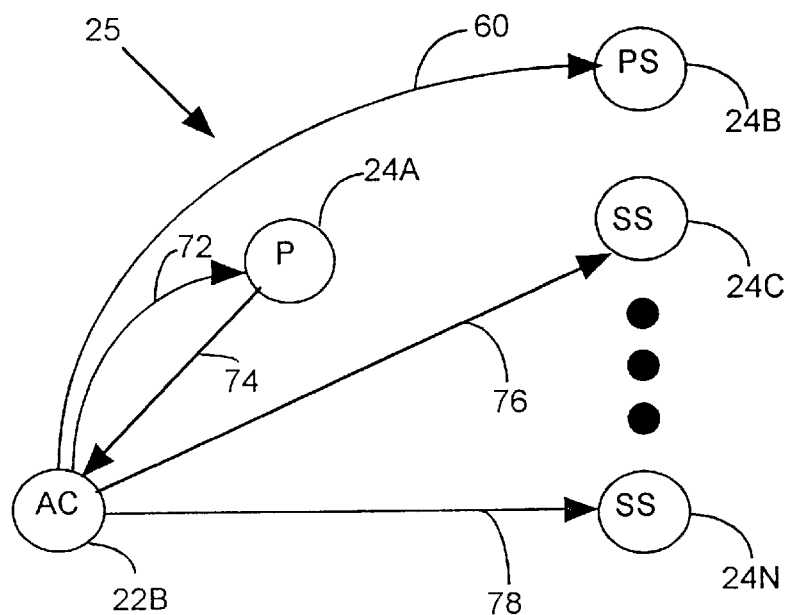
FIG. 6 illustrates processing operations associated with a client computer accessing a server computer aggregation with a dual-role proxy, in accordance with an embodiment of the invention.

FIG. 6 includes an arrow 60 representing the aggregation client computer 22B attempting to contact the primary server 24B. If the primary server 24B is inoperative, then the aggregation client computer 22B contacts the dual-role proxy server 24A, as shown with arrow 72. The dual-role proxy server 24A responds by passing updated aggregation information back to the aggregation client computer 22B, as shown with arrow 74. Thereafter, the aggregation client computer 22B can directly access the secondary servers 24C–24N, as shown with arrows 76 and 78.

It can now be appreciated that the dual-role proxy server computer 24A of the invention performs two roles. First, it operates as a server aggregation gateway for non-client server computers. Second, it operates as an information agent for client server computers.

The operation of an embodiment of the invention has now been described. Attention presently turns to a discussion of different techniques that may be used to implement the invention.

Figure 7:
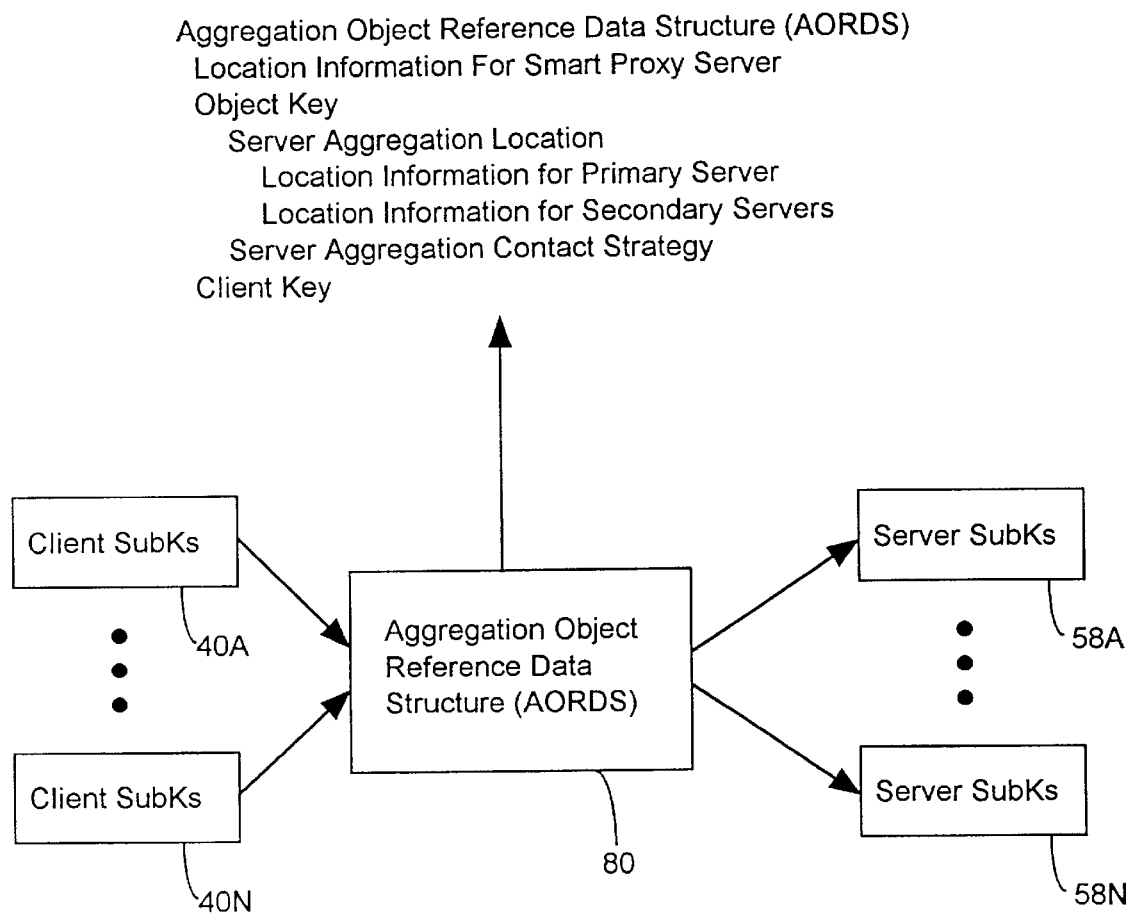
FIG. 7 illustrates an aggregation object reference data structure utilized in accordance with an embodiment of the invention.

FIG. 7 illustrates an aggregation object reference data structure (AORDS) 80 that may be used in accordance with the invention. Each AORDS 80 includes location information for the smart proxy server of the server aggregation. In addition, each AORDS includes an object key, including a server aggregation location and a server aggregation contact strategy. The server aggregation location information includes a field for the location information for the primary server and a field for the location information for the secondary servers. Finally, each AORDS includes a client key, which stores information that identifies whether the object associated with the AORDS is a server aggregation client.

A non-client of a server aggregation will have missing fields in the AORDS data structure. In other words, a remote procedure call associated with a non-client of a server aggregation will have information regarding the location of the smart proxy server, will have client key information indicating a non-client status, but will not have, or will have incomplete, object key information. As indicated above, the object key information includes server aggregation location information and server aggregation contact strategy information. The dual-role proxy server is relied upon by the non-client to have the primary server location information and the secondary servers location information and to effectuate communications with those servers.

A client of a server aggregation will have complete fields in the AORDS data structure. That is, smart proxy server location information will be available, client key information (indicating status as a client) will be available, and object key information will be available, namely location information for the primary server and location information for the secondary servers, and a server aggregation contact strategy. While the information may be complete, it may have to be periodically updated, as described in reference to FIGS. 5 and 6.

FIG. 7 illustrates that the AORDS data structure may be handled, along with other method call data, by client subcontracts 40 on the client computer side of the client/server system. As indicated in the background section, a client application program 34 generates a remote procedure call. Thereafter, client stubs 38 operate as an interface to a client sub-contract contract 40. The client sub-contract 40 is used to transport the remote procedure call over a transmission channel. Reverse processing is then performed at the server side. The general handling of object data structures in an object request broker of a distributed client/server system is known in the art.

Figure 8:
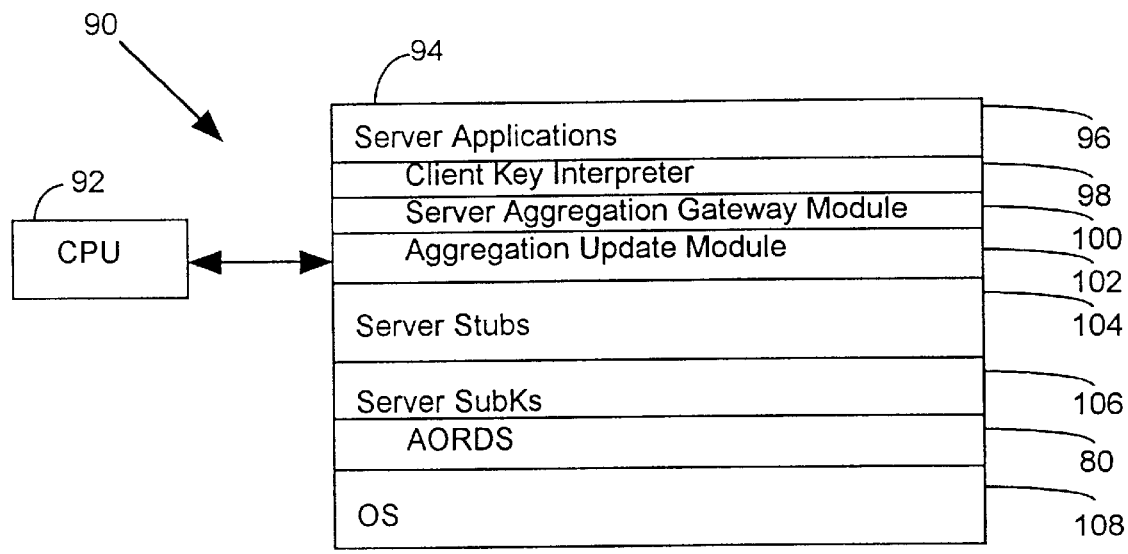
FIG. 8 illustrates a server computer configured in accordance with an embodiment of the invention.

FIG. 8 illustrates a server computer 90 in accordance with an embodiment of the invention. The server computer 90 includes a CPU 92 connected to a memory 94, which stores a set of executable programs. FIG. 8 illustrates server applications 96, including a client key interpreter 98. The client key interpreter 98, interprets the client key field of the AORDS 80. In other words, the client key interpreter 98 determines whether a remote procedure call is associated with a server aggregation client.

A server aggregation gateway module 100 is also stored in the memory 94. The server aggregation gate module 100 includes the logic for accessing the primary servers and secondary servers of the server aggregation when a nonclient remote procedure call is being processed.

Another application stored in the memory 94 of the server computer 90 is an aggregation update module 102. As its name implies, this executable program provides updated information on the server aggregation. This module is invoked, for example, during the processing shown in FIG. 6.

FIG. 8 also illustrates server stubs 104 stored in memory 94. Server subcontracts 106 are also stored in memory 94. The server subcontracts 106 handle the previously described AORDS 80. The memory 94 also includes an operating system 108.

The AORDS concept disclosed in accordance with the invention is highly beneficial because it supports the invention's concept of a dual-role proxy server computer. The concept finds further utility in its role of identifying different types of server aggregations. In other words, in accordance with another aspect of the invention, the AORDS information is scrutinized to determine what type of server aggregation is being invoked by a remote procedure call. This information can then be used to change selected parameters associated with the remote procedure call.

Figure 9:
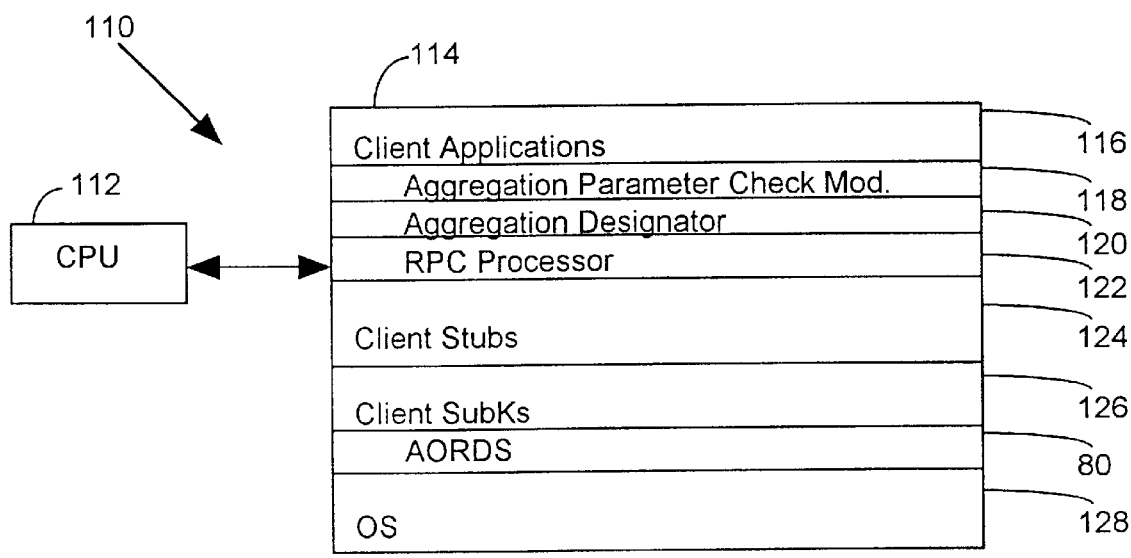
FIG. 9 illustrates a client computer configured in accordance with an embodiment of the invention.

This operation is more fully appreciated with reference to FIG. 9. FIG. 9 illustrates a client computer 110 operated in accordance with the invention. This client computer 110 includes a CPU 112 and a memory 114. The memory 114 stores a set of executable programs including client application programs 116. The client application programs 116 include an aggregation parameter check module 118. The aggregation parameter check module 118 checks the server aggregation location data field and the server aggregation contact strategy data field of the AORDS 80. Based upon this operation, the nature of the server aggregation 25 is determined.

Figure 10:
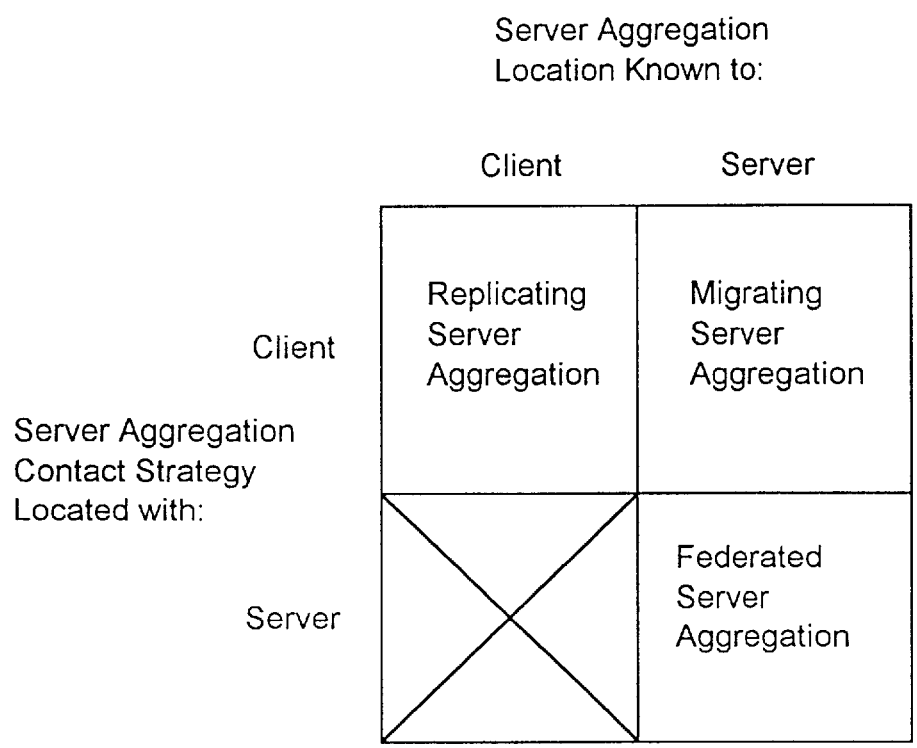
FIG. 10 illustrates a server aggregation characterization technique utilized in accordance with an embodiment of the invention.

FIG. 10 illustrates the different types of server aggregation topologies that are recognized in accordance with the invention. If the server aggregation location is known to the client computer (and its associated remote procedure calls) and the server aggregation contact strategy is also known to the client computer (and its associated remote procedure calls), then a replicating server aggregation is said to exist. A replicating server aggregation is one in which multiple servers maintain synchronized and consistent information. Thus, multiple clients can independently access replica servers for the same information.

It is impractical to expect a client to know the location of a server aggregation, yet not know the strategy to contact the server aggregation, thus the lower left corner of the box of FIG. 10 is crossed out.

Another server aggregation topology that is recognized in accordance with the invention is a migrating server aggregation. A migrating server aggregation exists when the client computer has a contact strategy (the server aggregation contact strategy of the AORDS 80), but does not have the server aggregation location (the server aggregation location of the AORDS 80). Most common scenarios of migration have the client computer 22 contacting the primary server and being forwarded to the new location of the server. Thus, the client computer knows the strategy (i.e. following the forwarding pointer), but not the location of the new server.

The final server aggregation topology that is recognized in accordance with the invention is a federated server aggregation. For this topology, the server aggregation location is known to the server and the contact strategy is located with the server, as shown in FIG. 10. Almost all cases of federation involve the primary server knowing both the locations of the other servers in the federation as well as the logic for interacting with them and building a response.

The aggregation designator 120 is an executable program that checks the server aggregation location field and the server aggregation contact strategy field of the AORDS 80 of the invention. Based upon the information it observes, it provides a designation to the server aggregation, pursuant to the framework shown in FIG. 10.

Thus, the present invention uses the server aggregation location information and server aggregation contact strategy of the AORDS 80 to identify a server aggregation topology. These information fields represent two critical bits of control that determine the different kinds of interaction between a client and an aggregation of servers. In accordance with the invention, one may structure the implementation of server aggregation features around these two pieces of information, providing a select set of strategies that can be employed for interacting with the servers in the aggregation. This advantage also applies to administrative interfaces.

A remote procedure call processor 122 may be used to alter parameters associated with a remote procedure call once the server aggregation topology is identified.

For example, if a replicating server aggregation is identified, the RPC processor 122 may be used to pre-fetch a list of replica servers that can respond to the same method call. In this case, if a client computer fails in its initial attempt to contact a server, the client computer immediately accesses the pre-fetched list of replica servers that can respond to the method invocation.

After a migrating server aggregation is identified, the RPC processor 122 may be used to set parameters that limit the number of migrations that can be performed to satisfy a method call.

Another example of how the RPC processor 122 may respond to the aggregation designation is to set context flags associated with the method call. For instance, the context flags may be used to determine which requests are propagated to the federation and which are necessarily serviced by the primary server only.

FIG. 9 also illustrates a set of client stubs 124 of the type previously described. FIG. 9 also illustrates client subcontracts 126 that handle the disclosed AORDS 80. Finally, FIG. 9 illustrates a operating system 128 associated with the client computer 110.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

I claim:

1. A client/server computer apparatus, comprising:
   a transmission channel;
   an aggregation of server computers connected to said transmission channel; and
   a client computer connected to said transmission channel, said client computer executing
      a first routine to check a server aggregation location data field and a server aggregation contact strategy data field of a remote procedure call generated by said client computer, and
      a second routine to designate said aggregation of server computers as replicating server computers, migrating server computers, or federated server computers based upon the result of said first routine.

2. The apparatus of claim 1 wherein said first routine designates said aggregation of server computers as replicating server computers when said server aggregation location data field is complete and said server aggregation contact strategy data field is complete.

3. The apparatus of claim 1 wherein said first routine designates said aggregation of server computers as migrating server computers when said server aggregation location data field is incomplete and said server aggregation contact strategy data field is complete.

4. The apparatus of claim 1 wherein said first routine designates said aggregation of server computers as federated server computers when said server aggregation location data field is incomplete and said server aggregation contact strategy data field is incomplete.

5. The apparatus of claim 1 wherein said client computer executes a third routine to modify a remote procedure call parameter after said aggregation of server computers is designated.

6. A computer readable memory storing executable instructions for execution by a client computer of a client/server computer system including an aggregation of server computers, comprising:
   a plurality of instruction sets stored in said computer readable memory, including
      a first instruction set to check a server aggregation location data field and a server aggregation contact strategy data field of a remote procedure call generated by said client computer; and
      a second instruction set to designate said aggregation of server computers as replicating server computers, migrating server computers, or federated server computers based upon said check operation of said first instruction set.

7. The computer readable memory of claim 6 wherein said first instruction set includes instructions to designate said aggregation of server computers as replicating server computers when said server aggregation location data field is complete and said server aggregation contact strategy data field is complete.

8. The computer readable memory of claim 6 wherein said first instruction set includes instructions to designate said aggregation of server computers as migrating server computers when said server aggregation location data field is incomplete and said server aggregation contact strategy data field is complete.

9. The computer readable memory of claim 6 wherein said first instruction set includes instructions to designate said aggregation of server computers as federated server computers when said server aggregation location data field is incomplete and said server aggregation contact strategy data field is incomplete.

10. The computer readable memory of claim 6 further comprising a third instruction set to modify a remote procedure call parameter after said aggregation of server computers is designated.

11. A method of processing a remote procedure call from a client computer to an object stored on an aggregation of server computers, said method comprising the steps of:

checking a server aggregation location data field and a server aggregation contact strategy data field of said remote procedure call; and designating said aggregation of server computers as replicating server computers, migrating server computers, or federated server computers based upon said checking step.

12. The method of claim 11 wherein said designating step includes the step of designating said aggregation of server computers as replicating server computers when said server aggregation location data field is complete and said server aggregation contact strategy data field is complete.

13. The method of claim 11 wherein said designating step includes the step of designating said aggregation of server computers as migrating server computers when said server aggregation location data field is incomplete and said server aggregation contact strategy data field is complete.

14. The method of claim 11 wherein said designating step includes the step of designating said aggregation of server computers as migrating server computers when said server aggregation location data field is incomplete and said server aggregation contact strategy data field is incomplete.

15. The method of claim 11 further comprising the step of processing remote procedure call information in response to said designating step.

16. The method of claim 15 wherein said processing step includes the step of modifying a remote procedure call parameter in response to said designating step.

17. The method of claim 15 wherein said processing step includes the step of compiling client/server statistics in response to said designating step.

18. A method executed by a client computer under the control of a program, said client computer being connected to an aggregation of server computers, said client computer including a memory storing said program, said method comprising the steps of:

generating at said client computer a remote procedure call to said aggregation of server computers;

checking a server aggregation location data field and a server aggregation contact strategy data field of said remote procedure call; and designating said aggregation of server computers as replicating server computers, migrating server computers, or federated server computers based upon said checking step.

19. The method of claim 18 wherein said designating step includes the step of designating said aggregation of server computers as replicating server computers when said server aggregation location data field is complete and said server aggregation contact strategy data field is complete.

20. The method of claim 18 wherein said designating step includes the step of designating said aggregation of server computers as migrating server computers when said server aggregation location data field is incomplete and said server aggregation contact strategy data field is complete.

21. The method of claim 18 wherein said designating step includes the step of designating said aggregation of server computers as migrating server computers when said server aggregation location data field is incomplete and said server aggregation contact strategy data field is incomplete.

22. The method of claim 18 further comprising the step of processing remote procedure call information in response to said designating step.

23. The method of claim 22 wherein said processing step includes the step of modifying a remote procedure call parameter in response to said designating step.

24. The method of claim 22 wherein said processing step includes the step of compiling client/server statistics in response to said designating step.

\* \* \* \* \*